Feb. 19, 1963 D. J. BATES Re. 25,329

PERIODICALLY FOCUSED TRAVELING WAVE TUBE
WITH TAPERED PHASE VELOCITY

Original Filed Oct. 2, 1958 5 Sheets-Sheet 1

INVENTOR.
DAVID J. BATES,
BY Daniel T. Anderson
AGENT

INVENTOR
DAVID J. BATES,
BY Daniel T. Anderson
AGENT

INVENTOR.
DAVID J. BATES,
BY
Daniel T. Anderson
AGENT

INVENTOR.
DAVID J. BATES,

BY Daniel T. Anderson

AGENT

Feb. 19, 1963 D. J. BATES Re. 25,329
PERIODICALLY FOCUSED TRAVELING WAVE TUBE
WITH TAPERED PHASE VELOCITY
Original Filed Oct. 2, 1958 5 Sheets-Sheet 5
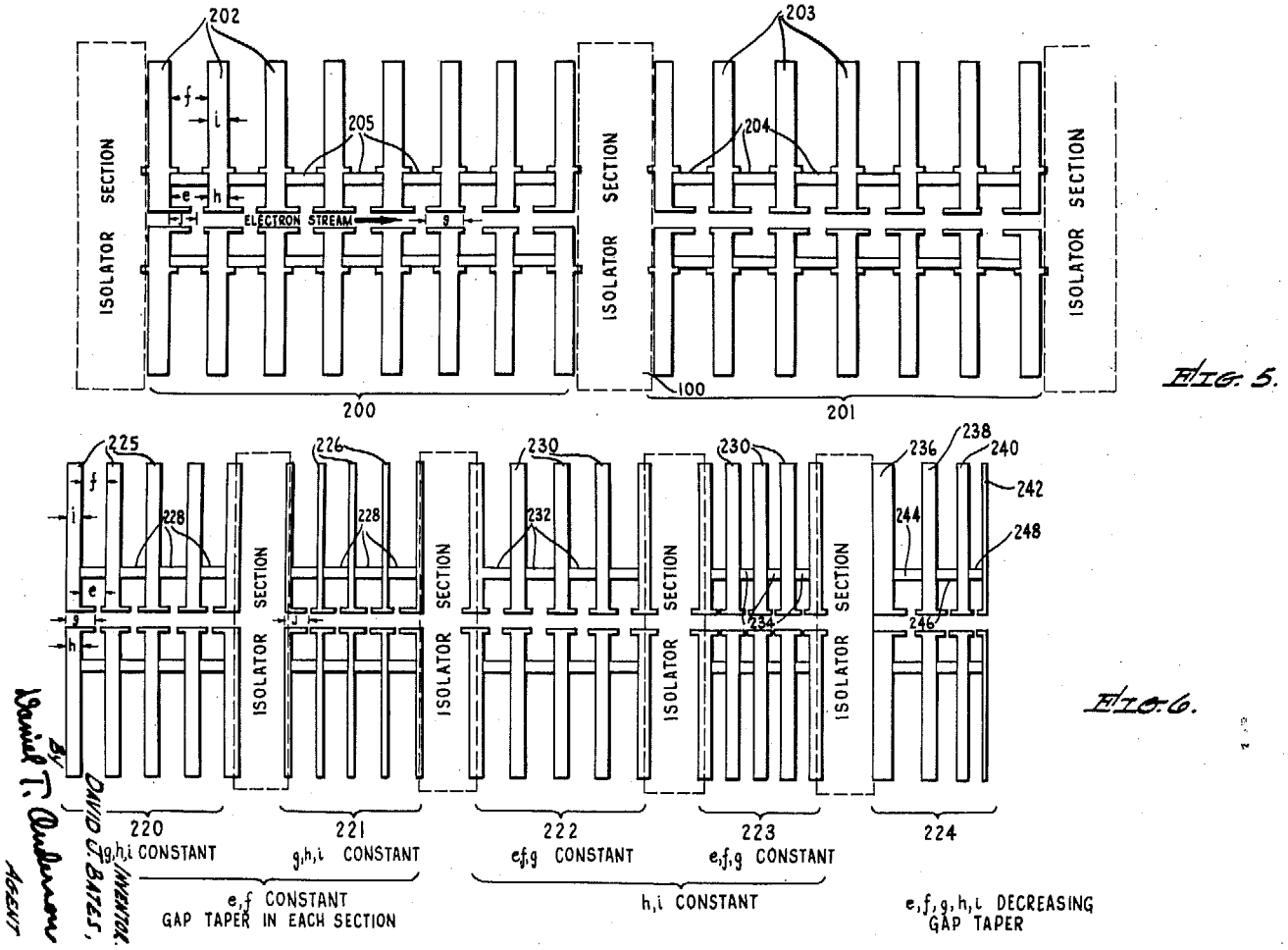
INVENTOR.
DAVID J. BATES,
By Daniel T. Anderson
AGENT United States Patent Office Re. 25,329
Reissued Feb. 19, 1963

25,329

PERIODICALLY FOCUSED TRAVELING WAVE TUBE WITH TAPERED PHASE VELOCITY

David J. Bates, Los Angeles, Calif., assignor to Hughes Aircraft Company, Culver City, Calif., a corporation of Delaware Original No. 2,956,200, dated Oct. 11, 1960, Ser. No. 764,885, Oct. 2, 1958. Application for reissue May 11, 1962, Ser. No. 195,025
11 Claims. (Cl. 315—3.5)

Matter enclosed in heavy brackets [ ] appears in the original patent but forms no part of this reissue specification; matter printed in italics indicates the additions made by reissue.

This invention relates to traveling-wave tubes, and particularly to arrangements for tapering slow-wave structures so as to achieve maximum interaction between an electron beam and radio frequency electromagnetic wave energy.

In traveling-wave tubes, as is well known, a wave of radio frequency electromagnetic energy is caused to interact with an electron stream. The wave is slowed to substantially below the velocity of light by being confined to traverse an effectively tortuous path. The path extends at different points along the path of the electron stream so as to provide a periodic structure having the proper phase relationships with respect to the electron stream for the electron stream to interact with or electromagnetically "push" and thus to amplify the radio frequency wave.

The position of the members which define the tortuous path relative to each other and to the electron stream is extremely critical. This slow-wave structure, the classical form of which is the helix, accordingly has in prior structures been extremely difficult to manufacture with the required precision. When the desired precision has been achieved, it has usually resulted in a delicate structure which can easily be disarranged under extreme environmental conditions or through accident. A further serious complication is, therefore, added when it is desired to fabricate a slow-wave structure so as to achieve most effective interaction between the radio frequency wave and the electrons projected along the entire length of the interaction volume. It is known that as an electron stream is caused to give up energy to the radio frequency wave, the electron stream is slowed down and the interaction becomes less effective. Accordingly, a number of techniques have been employed for achieving more efficient interaction. These having included, as with the helix, a tapering of the space periodicity of the radio frequency structure toward the collector end of the tube. When such techniques have been employed, however, the requirements for fabricating the structures to the greater precision which is demanded have often been too severe to be practical.

Accordingly, it is an object of the present invention to provide an improved traveling-wave tube which is simple to fabricate, yet which achieves maximum interaction between a radio frequency wave and an electron stream along the entire path of the stream.

Another object of this invention is to provide an improved slow-wave structure which is simple and economical to construct, but which may be readily tapered to extremely precise dimensions.

A further object of this invention is to provide an improved slow-wave structure tapering mechanism for traveling-wave tubes.

These and other objects of the invention are achieved by an arrangement which fabricates the traveling-wave tube slow-wave structure out of a plurality of centrally apertured ferromagnetic discs serially spaced along the path of an electron beam. Ferromagnetic drift tubes are disposed within the aperatures contiguous to the beam and provide gaps between adjacent ones for focusing the beam and for coupling between the beam and the traveling wave. Individual ones of a plurality of spacer rings are each interposed betwen a different adjacent pair of ferromagnetic discs and each define the outer periphery or cylindrical surface of an interaction cell or cavity making up the slow-wave structure. A highly conductive surfacing may be applied to the interior or the cavity surfaces of the discs and spacer rings. With this arrangement, effective tapering may be achieved by a reduction in the axial dimensions of the ferromagnetic discs and drift tubes without otherwise affecting the electromagnetic parameters of the interaction cells. Another tapering mechanism is achieved by varying the axial thickness of the spacer rings in a manner to successively shorten the interaction cavities toward the collector end of the tube. By thus decreasing the distance between points along the slow-wave structure where the electron stream is coupled to the interaction cells the electron stream travels a shorter distance between interaction cells toward the output end of the tube and thereby maintains synchronism with the traveling-wave energy, even though the electrons of the stream are actually being decelerated. Thus it may be said that the relative phase velocity of the radio frequency energy is decreased. Another technique of tapering is to provide a means for shifting the location of the point or region within each interaction cell where the cell is coupled to the electron stream without, as with the first method outlined above, otherwise altering the electromagnetic parameters of the interaction cell. The means for coupling between the interaction cells and the electron stream may be the gap between drift tubes extending from the ferromagnetic discs toward each other into the interaction cell. The gap between drift tubes may be progressively shifted upstream with respect to the electron beam so that the electron stream interacts at progressively shorter distance with successive ones of the interaction cells along the length of the slow-wave structure. It is apparent that an inherent limitation exists in the magnitude of tapering which may be achieved with this latter mode of tapering, that is, the total shifting of the coupling gaps may not exceed the axial length of one interaction cell.

In accordance with one feature of the present invention, isolating, severing means which serve to prevent reflected energy along the slow-wave structure from causing undesired oscillations are utilized also for permitting combinations and repetitions of the above tapering mechanisms along the length of the tube. For example, the gap tapering technique may be utilized and instead of being limited to a total tapering of one drift tube length, there may be that amount of tapering per severed section.

In addition, discontinuities between adjacent sections of the slow-wave structure having different space periods or other characteristics due to utilizing any of the above tapering mechanisms is masked or minimized by the isolator means separating the two different sections.

The novel features of this invention, as well as the invention itself, may be better understood from the following description, taken in conjunction with the accompanying drawings in which like reference numerals refer to like parts and in which:

FIG. 5 is a simplified, schematic view of two groups of successive elements employed in the slow-wave structure showing details of the tapering in accordance with the present invention; and FIG. 6 is a simplified schematic view of a number of groups of elements employed in the slow-wave structure depicting further details of the tapering accomplished in accordance with the present invention.

Figure 1:
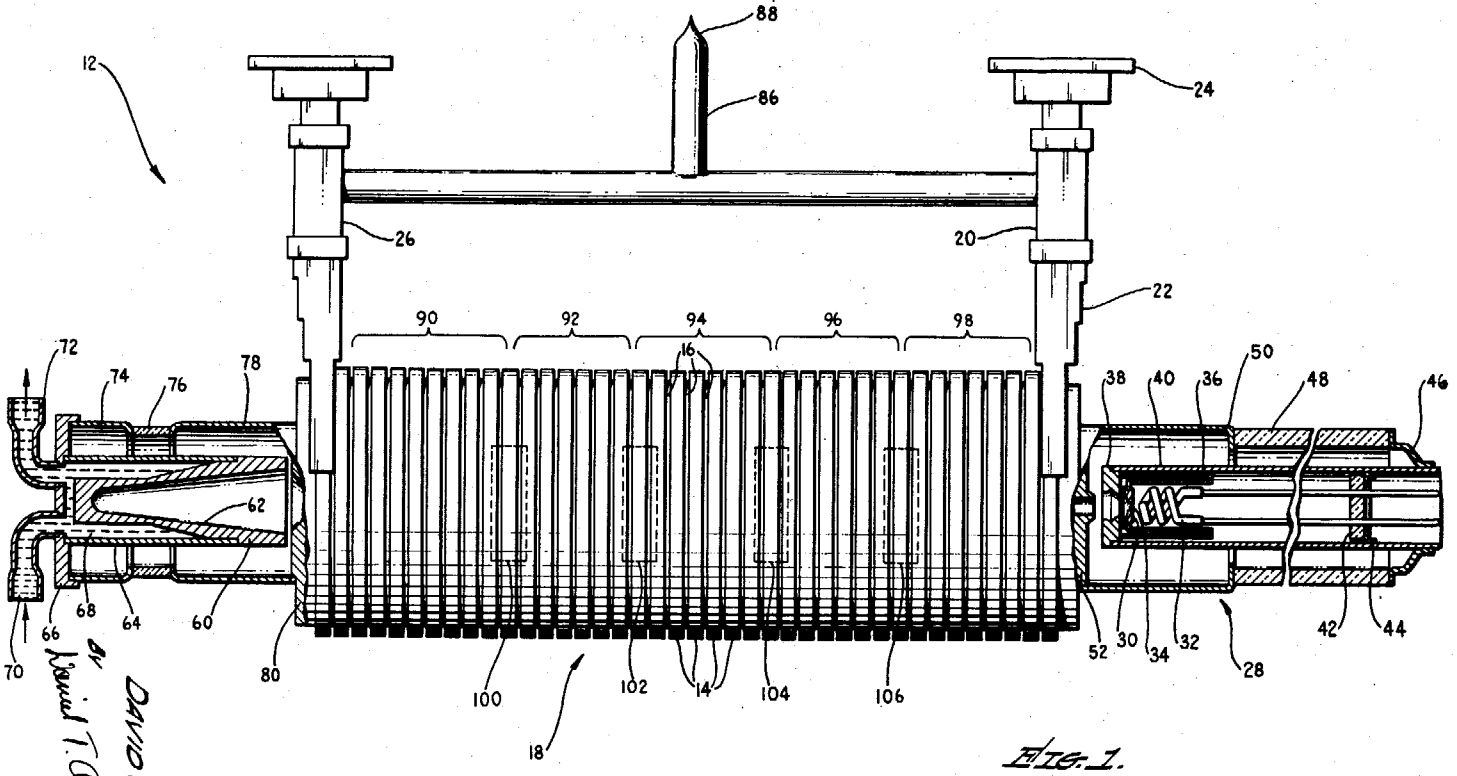
FIG. 1 is a side view, partly broken away and partially in section, of a traveling-wave tube in accordance with the present invention.

Referring to the drawings and their description, a number of features are shown for purposes of completeness of discussion of a traveling-wave tube according to the present invention, which features are not claimed in the present application but are claimed and described more fully in applications assigned to the assignee of the present application and filed concurrently herewith: Self Aligning Traveling-Wave Tube and Method, by T. Leonard and T. J. Flannery, Serial Number 764,886; Severed Traveling-Wave Tube, by D. J. Bates and O. T. Purl, Serial Number 764,883, which discusses in greater detail and claims the structure illustrated in part in the present FIGS. 2 and 3; and Periodically Focused Traveling-Wave Tube, by D. J. Bates, H. R. Johnson and O. T. Purl, Serial Number 764,884.

Referring with more particularly to FIG. 1, there is shown a traveling-wave tube 12 utilizing a plurality of annular disc-shaped focusing magnets 14. In the example of this figure, these are permanent magnets and are diametrically split, as shown in later figures, to permit their being easily slipped between assembled adjacent ones of a series of ferromagnetic pole pieces 16, which are also shown in more detail in the later figures. The system of pole pieces 16 and magnets 14 form both a slow-wave structure and envelope 18.

Coupled to the right hand or input end of the slow-wave structure 18 is an input waveguide transducer 20 which includes an impedance step transformer 22. A flange 24 is provided for coupling the assembled traveling-wave tube 12 to an external waveguide or other microwave transmission line (not shown). The construction of the flange 24 includes a microwave window (not shown) transparent to radio frequency energy but capable of maintaining a pressure differential for maintaining a vacuum within the traveling-wave tube 12. At the output end of the tube 12, shown in the drawing as the left-hand end, an output transducer 26 is provided which is substantially similar to the input impedance transducer 20.

An electron gun 28 is disposed at the right hand end, as shown in the drawing, of the traveling-wave tube 12 and comprises a cathode 30 which is heated by a filament 32. The cathode 30 has a small central opening 34 to aid in the axial alignment of the gun assembly with the remainder of the traveling-wave tube 12. The cathode 30 is secured about its periphery by a cylindrical shielding member 36 which is constructed in a manner to fold cylindrically, symmetrically back upon itself to form a double cylindrical shield and an extended thermal path from the cathode 30 to its outer supporting means. Such support and an electrical, highly conductive path to the cathode is thus achieved while providing considerable thermal insulation for the cathode and filament due to the extended or tortuous path for heat conduction, as well as because of the multiple cylindrical shielding against radiant heat which is provided by the cylinders shown. For additional details of this type of gun construction, see the patent to J. A. Dallons, No. 2,817,039, entitled "Cathode Support," issued December 17, 1957, and assigned to the assignee of the present invention.

A focusing electrode 38 supports the cylindrical shielding member 36. The focusing electrode 38 is generally maintained at the same potential as that of the cathode 30 and is shaped to focus the electron stream emitted by the cathode in a well-collimated, high perveance beam of electrons which traverses the slow-wave structure 18 and electromagnetically interacts with microwave energy being propagated therealong. The electron gun configuration is in accordance generally with the teachings in the Patent No. 2,811,667, by G. R. Brewer, which issued October 29, 1957, entitled "Electron Gun," which is assigned to the assignee of the present invention, and to which reference may be made for a more detailed explanation. The focusing electrode 38 is in turn supported by a hollow cylindrical support 40 which extends from the periphery of the focusing electrode to the right hand end of the traveling-wave tube 12. Its opening is hermetically sealed with a metal to ceramic seal 42 by means of a sealing flange 14 made of a material having a low coefficient of thermal expansion, such as Kovar. The right hand extremity of the cylindrical support 40 is supported by an annular flange member 46, which also may be of Kovar, and which is sealed in turn to a hollow ceramic supporting tube 48. The ceramic tube 48 further thermally insulates the inner intensively heated members of the electron gun 28 and also provides electrical insulation between the cathode-beam focusing assembly and the higher potential accelerating anode 52. Substantially encasing the electron gun 28 and secured to the central or radio frequency structure of the traveling-wave tube 12 is a hollow cylinder 50, which may be kovar, to which is sealed the ceramic cylinder 48, thus completing the vacuum envelope about the right hand end of the traveling-wave tube 12.

At the left hand end of the tube 12, as viewed in FIG. 1, there is shown a cooled collector electrode 60 which has a conically-shaped inner surface 62 for collecting the electrons from the high power electron stream and dissipating their kinetic energy over a large surface. The collector electrode is supported within the end of a water jacket cylinder 64 which is in turn supported by an end plate 66. A water chamber 68 is thus formed between the outer surface of the collector electrode 62 and the inner cylindrical surface of water jacket 64. A water input tube 70 supplies cool water to this chamber and a water output tube 72 exhausts the heated water out of the water chamber 68. Thus, considerable power may be dissipated without destruction of the collector electrode. Although water has been specified, obviously, other liquids or gases may be used as coolants.

The end plate 66 is sealed to a supporting cylinder 74, which may be of Kovar, and which is in turn sealed to a ceramic insulating cylinder 76. This ceramic insulating cylinder 76 is sealed at its opposite end to another Kovar supporting cylinder 78, which is in turn supported and sealed to the slow-wave structure end disc 80. The collector 62, the end plate 66, the supporting cylinders 74 and 78 and the ceramic insulating cylinder 76 are all coaxially supported in alignment with the axis of the traveling-wave tube 12.

For vacuum pumping or out-gassing the traveling-wave tube 12, a double-ended pumping tube 86 is connected to both of the input and output waveguide transducers 20 and 26. Outgassing during bake-out of the entire traveling-wave tube 12 is thus achieved as rapidly as possible. After the outgassing procedure, the tube 86 is separated from the vacuum pumping system by pinching off the tube at the tip 88.

The traveling-wave tube of the present invention may be severed into a number of amplifying sections 90, 92, 94, 96 and 98. Each of the amplifying segments or sections is isolated from the others by an isolator or termination section 100, 102, 104 or 106. The structure of these isolating sections will be discussed in detail in connection with FIGS. 2 and 4. It suffices at this point to describe their function generally as providing a substantially complete radio frequency isolation between adjacent sections of the slow-wave structure 18 while at the same time allowing the electron stream to pass straight through the entire length of the traveling-wave tube 12. Each amplifying section thus provides an optimum gain while providing freedom from oscillations due to regeneration. The loss in gain due to each of these isolation sections is of the order of a few decibels and is a low price to pay for the large overall gain and power handling capabilities of a traveling-wave tube constructed in accordance with the present invention. It should be noted that although the isolation sections provide substantially complete radio frequency isolation between adjacent amplifying sections, the electron stream is modulated at the output of each amplifying section. The stream thus modulated, as it enters the subsequent amplifying section, launches a new wave therein which is further amplified by the interaction between the new traveling wave and the electron stream. Thus there is provided unidirectional coupling through the electron stream between adjacent amplifying sections.

Figure 2:
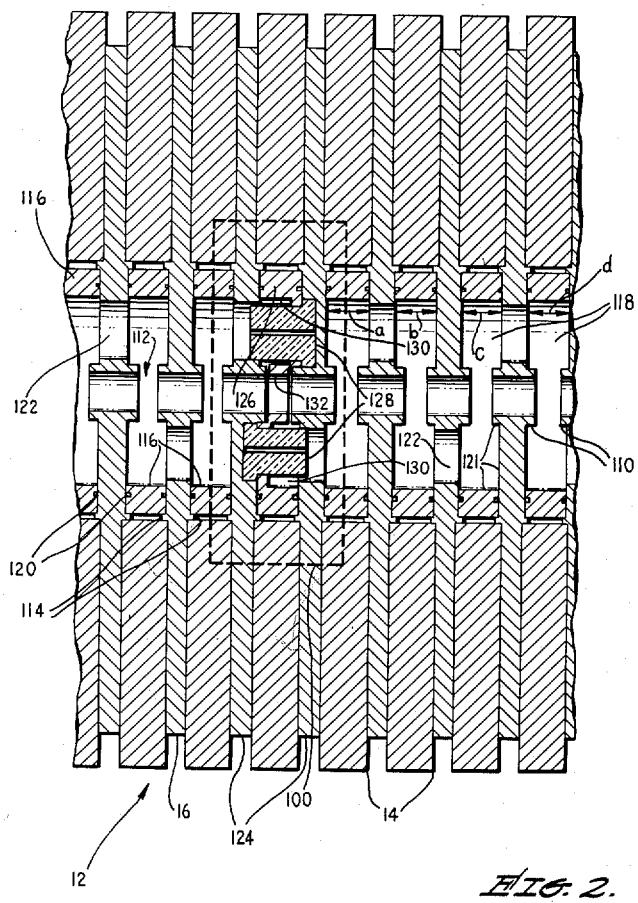
FIG. 2 is an enlarged side sectional view of a portion of the slow-wave structure of the traveling-wave tube of FIG. 1.

Referring with more particularity to FIG. 2, there is shown a detailed sectional view of a portion of the traveling-wave tube of FIG. 1. The ferromagnetic pole pieces 16 are shown to extend radially inwardly to approximately the perimeter of the axial electron stream. Disposed contiguously about the electron stream in each case is a short drift tube 110. The drift tube 110 is in the form of a cylindrical extension or lip protruding axially along the stream from the surface of the pole piece 16.

Adjacent ones of the drift tubes 110 are separated by a gap 112 which functions as a magnetic gap to provide a focusing lens for the electron stream and also as an electromagnetic interaction gap to provide interaction between the electron stream and microwave energy traversing the slow-wave structure.

At a radial distance outwardly from the drift tubes 110 each of the pole pieces 16 has a second short cylindrical extension 114 protruding from its surface. The extension 114 provides an annular shoulder concentric about the axis of the tube for aligning the assembly of the component elements of the slow-wave structure 18. Disposed radially within the extension 114 is a conductive, non-magnetic circuit spacer 116 which has the form of an annular ring having an outer diameter substantially equal to the inner diameter of the cylindrical extension 114. The axial length of the spacer 116 determines the axial length of the microwave cavities 118 which are interconnected along the length of the slow-wave structure 18. It is thus seen that the slow-wave structure may be assembled and self-aligned by stacking alternately the pole pieces 16 and the spacers 116. Each spacer 116 has two annular channels 120 in which, during the stacking procedure, a sealing material, such as a brazing alloy, is placed. When the slow-wave structure 18 is assembled, it may be placed in an oven within a protective non-oxidizing atmosphere and heated so that the brazing alloy in the channels 120 melts and fuses or brazes the adjacent members of the slow-wave structure 18 together to form a vacuum tight envelope. The spacers 116 are fabricated of a nonmagnetic material, such as copper, thus providing a highly conductive cavity wall, while not magnetically shorting out the focusing gaps 112. The entire interior surfaces of the cavities are preferably plated with a highly conductive material such as a thin silver or gold plating 121.

For interconnecting adjacent interaction cells, a coupling hole 122 is provided in each of the ferromagnetic pole pieces 16, the more detailed shape and orientation of which will be described in connection with the description of FIG. 3 below. Also disposed between adjacent pole pieces 16 are the focusing magnets 14 which are annular in shape and fit angularly or azimuthally symmetrically about the cylindrical shoulder extensions 114. The magnets 14 may be diametrically split to facilitate their being applied to the slow-wave structure 18 after it has been otherwise assembled. The axial length of the magnets 14 is substantially equal to the axial spacing between adjacent pole pieces 16, and their radial extent is approximately equal to or may be, as shown, greater than that of the pole pieces 16. To provide the focusing lenses in the gaps 112, adjacent ones of the magnets 14 are stacked with opposite polarity, thus causing a reversal of the magnetic field at each successive lens along the tube.

Referring to a typical isolator section 100, there is shown a substantial continuity of the pole piece-magnet-spacer assembly. However, the pole pieces 124 at either end of the isolator section and the spacer 126 are somewhat modified, with respect to pole piece 16 and spacer 116 respectively, which will be shown with greater clarity in FIG. 4. It is sufficient here to point out that attenuating material, which may be in the form of lossy ceramic buttons 128 which extend from within a coupling hole 122 through the special spacer 126 and partially into the wall of the pole piece 124 opposite the coupling hole. The spacer 126 forms a pair of modified cavities 130 which lie opposite respective ones of the coupling holes 122 and which are substantially filled with the lossy attenuating material.

Figure 4:
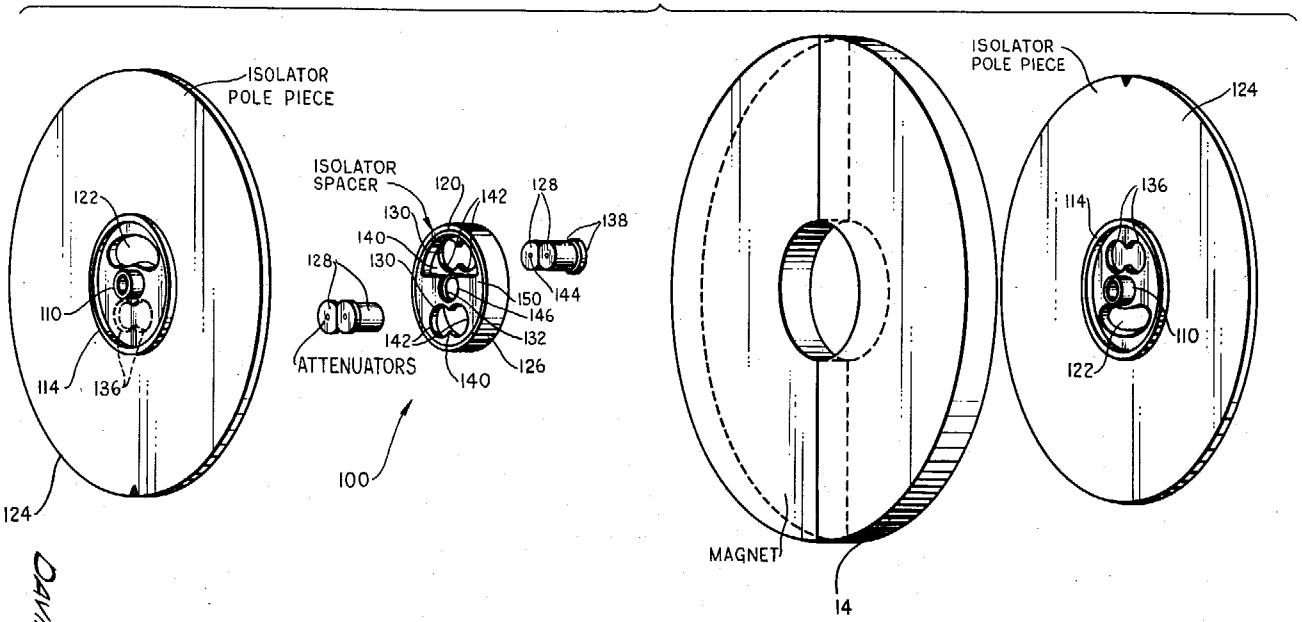
FIG. 4 is an exploded perspective view of a group of special elements employed in the slow-wave structure of FIG. 2.

The two cavities 130 are substantially isolated from each other by a short circuiting vane or septum 150 which is shown more clearly in FIG. 4. Each of the cavities 130 is isolated from interaction with the electron stream by a central portion of the spacer 126 which portion has the form of a ring of radial dimensions substantially equal to those of the drift tubes 110 and which extends between two of the drift tubes 110 as shown to substantially shield the electron stream from the slow-wave structure in the region of the isolator section 100.

Along the length of the slow-wave structure 18, individual ones of the pole pieces 16 are spaced by axial distances represented by a, b, c and d. In accordance with one feature of the invention, these distances and the associated lengths of the spacers 116 and the magnets 14 may be adjusted along the length of the slow-wave structure 12 to provide a tapering thereof. In general, these distances are decreased toward the collector end so that as the electron stream is decelerated from giving up energy to the traveling waves, it may nevertheless remain in synchronism therewith because the space period of the cells is decreased. In other words, since the electron stream need travel a shorter distance between cells, it appears to pass the cells at the same rate, even though it is actually slowing down, thus the relative phase velocity of the traveling waves, it may be considered, is decreased and the desired synchronous interaction may continue to a maximum degree along the entire length of the traveling-wave tube.

Additional discussion on the tapering is given below in connection with the description of FIGS. 3, 5 and 6, subsequent to a completion of the presentation of the other aspects of the figures.

Figure 3:
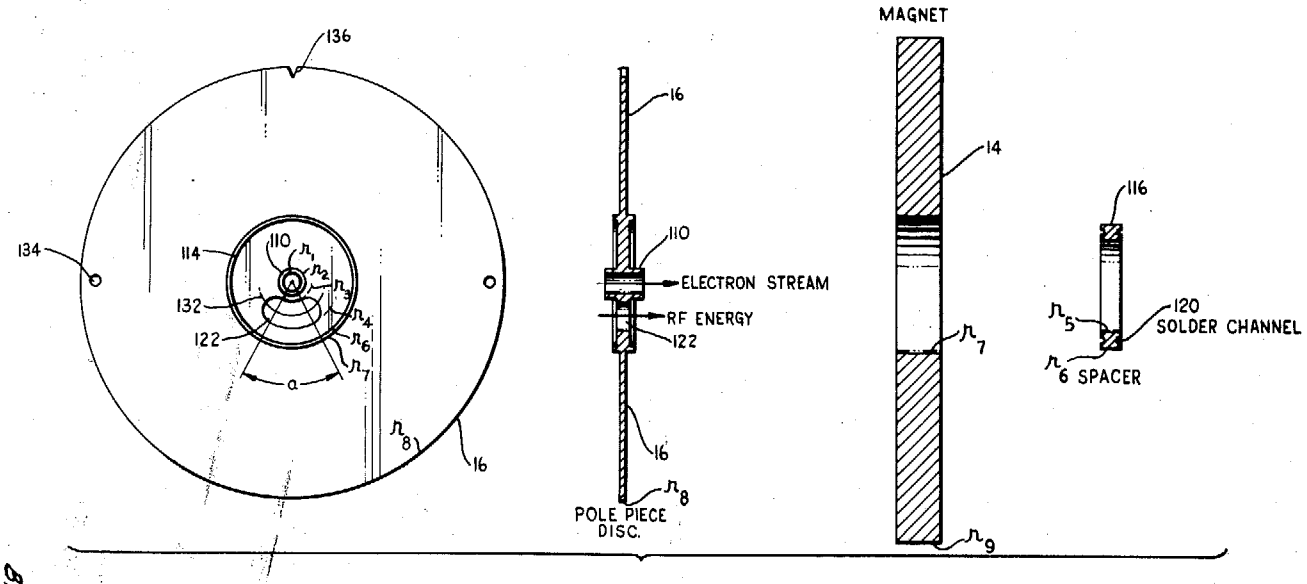
FIG. 3 is an exploded view of the elements utilized in the slow-wave structure of FIG. 2.

Referring to FIG. 3, one set of the plurality of pole pieces, magnets and spacers is shown for purposes of description more clearly how the individual elements of the slow-wave structure 18 are fabricated and assembled. A typical pole piece 16 is shown twice in the figure, once in plan and once in side elevation. A typical magnet 14 and a typical spacer 116 are shown in side elevation only.

Referring to the side elevation view of the pole piece 16, the orientation of the pole piece 16 concentrically about the electron stream is shown. Substantially immediately surrounding the electron stream is the short drift tube 110 which extends axially in both directions normal to the plane of the pole piece 16. The remainder of the pole piece extends radially outwardly from the drift tube 110 as shown. Positioned radially in between these two extremes are the cylindrical shoulder extensions 114 which extend axially outwardly from both faces of the pole piece 16.

The outer diameter of the cylindrical extension 114 supports the focusing magnet 14 coaxially about the electron stream, while the inner diameter of the extension 114 rests against the outer periphery of the spacer 116. The inner diameter of the spacer 116 determines the outer dimension of the interaction cell which is formed between adjacent ones of the pole pieces 16. Before assembly, a sealing material is placed in the channels 120, which are continuous, annular grooves in the end surfaces of the spacers 116.

The dimensions e, f and g indicate the axial lengths of the actual elements which may be adjusted to provide the tapering mentioned above in connection with FIG. 2. The dimension e is the axial length of a spacer 116; f is the axial length of a focusing magnet 14; and g is the axial length of a drift tube 110. In the tapering of FIG. 2, e, f and g may be equally decreased toward the collector end of the tube 12.

In accordance with another feature of the invention, which will be discussed in connection with FIGS. 5 and 6, the dimensions g, h and i may be together varied independently from e and f to achieve a type of tapering different from that mentioned in connection with FIG. 2. The dimension h is the axial thickness of the interaction cell wall portion of a pole piece 16; while i is the axial thickness of the outer, magnet separating portion of a pole piece 16.

An off-center coupling hole 122 is provided through each of the pole pieces 16 to provide the transfer of radio frequency energy from cell to cell along the slow-wave structure 18.

The size, shape and orientation of the coupling hole 122 may be more clearly seen in the plan view thereof at the left hand end of FIG. 3. The drift tube 110 is shown as having an inner radius $r_1$ slightly larger than the radius of the electron stream and having an outer radius $r_2$ which substantially defines the inner radius of the interaction cell. The kidney-shaped coupling hold 122 may be formed by an end mill having a diameter extending from $r_3$ to $r_4$. The end mill is pressed through the thickness of the pole piece 16 centered upon the arc of a circle 132. The end mill, or preferably the work, may then be swung along this arc keeping its center on the circle 132. The work is rotated through an arc of an angle a where a may be any angle between zero degrees and, for example, approximately 60°. Thus, the kidney-shaped coupling hole 122 lies between a radius $r_3$ and $r_4$ and has circular ends of diameter $r_4$—$r_3$.

Disposed radially outwardly from the coupling hole 122 is a cylindrical shoulder extension 114, the inner radius of which is designated $r_6$ and is substantially equal to the outer radius of the spacer 116. The inner radius $r_5$ of the spacer 116 determines the outer dimension of the radio frequency interaction cell. The outer radius of the extension 114, designated as $r_7$, is substantially equal to the inner radius of the magnet 14. The outer radius of the pole piece 16 is designated $r_8$, and the outer radius of the magnet 14 is designated $r_9$.

For angular alignment purposes during assembly, one or more sets of holes 134 are provided through the pole pieces 16 to hold them in a predetermined angular position with respect to each other. A reference notch 136 may be provided on the periphery of each of the pole pieces 16 in order that one may always know from an observation of the outer surface of the assembled tube what the angular orientation of each pole piece is. In the example described here, the notch is always provided opposite the center of the kidney-shaped coupling hold 122.

Referring to FIG. 4, there is shown an exploded view of a typical one of the isolator sections shown in dotted lines in FIG. 1, for example, the isolator section 100. The isolator pole pieces 124 are shown in perspective to point out the manner in which they are modified from the typical circuit pole pieces 16. A pair of overlapping circular recessions 136 are provided in the face of each of the isolator pole pieces 124 toward the middle of the isolator section 100. The circular recessions 136 extend approximately half-way through the pole piece 124 and retain the enlarged head portions 138 of the attenuator buttons 128. The attenuator buttons 128 may be formed of a porous ceramic impregnated with carbon. This may be done by soaking the ceramic in a carbohydrate solution, such as sugar, and then baking the soaked piece in an oxygen-free atmosphere to leave a residue of carbon distributed uniformly throughout the volume of the ceramic.

The focusing magnet 14 is typical of the remainder of the focusing magnets and need not be specially modified for the isolator section. The special isolator spacer 126 fits radially within the cylindrical shoulder extensions 114 and has a pair of cavities 130 one each associated with a coupling hole 122. A web end portion 140 closes the end of each of the cavities 130 except for a pair of overlapped openings 142 which are oriented respectively concentric with the circular recessions 136, but have a lesser diameter. The attenuator buttons 128 extend then from the depth of the recessions 136 through the openings 142 in the web end portion 140 through a cavity 130 to approximately half-way through the opposite coupling hole 122.

A circular shoulder 146 is provided on each side of the spacer 126 to receive the end of the drift tube 110 from each of the pole pieces. It is thus seen that the two cavities 130 are isolated from each other by a conductive midportion or vane 150. The microwave energy in the slow-wave structure 18 to the left in the drawing of the isolator spacer 126 may enter coupling hole 122 of the left hand isolator pole piece shown in FIG. 4 and will intercept the ends of two of the attenuator buttons 128 approximately halfway through the coupling hole 122. Whatever fraction of the microwave energy is not absorbed and dissipated in that portion of the lossy ceramic may pass on into the associated cavity 130 where it will eventually be completely absorbed.

In exactly the same manner, microwave energy in the slow-wave structure to the right of the isolator section and traveling toward the isolator section will be substantially completely absorbed by the other termination.

In the operation of the traveling-wave tube 12, microwave energy traverses from right to left along the slow-wave structure, being amplified first in section 98 due to its interaction with the electron stream. Near the output of this amplifying section, the traveling wave has grown and has caused considerable density modulation in the electron stream. At the first isolator section, section 106 in the drawing, the radio frequency energy in the slow-wave structure 18 is substantially completely absorbed. However, the modulated electron stream passes on into the next amplifier section, section 96, where it launches a new traveling wave in that section. The new traveling wave grows and is amplified by the electron stream until reaching its output end at the isolator section 104. The electron stream is further modulated and the RF energy in the slow-wave structure is again completely absorbed. This procedure is repeated until the highly modulated electron stream enters the output amplifier section 90 through the isolator section 100 and launches a high energy traveling wave upon the output section 90 of the slow-wave structure 18. The output of this final section is fed into the output waveguide through the transducer 26.

The isolator sections 100, 102, 104 and 106 each represent a loss of a few decibels of amplification. However, overall they vastly increase the amount of power amplification or gain which may be achieved in a single traveling-wave tube. The isolation sections isolate adjacent amplifying sections, thereby to preclude instability and oscillations due to reflections and to too great an amplification in a single traveling-wave tube section.

Referring to FIG. 5, a simplified schematic type of drawing is used in order to illustrate clearly another embodiment of a tapering traveling-wave tube constructed in accordance with the present invention.

As in FIG. 3, the dimensions e, f, g, h and i represent the various axial lengths of certain of the elements making up the slow-wave structure 18. In this type of tapering, which may be designated as gap tapering, and that of FIG. 2 as cavity tapering, the interaction cell length remains constant while the axial position of the center of the gap with respect to the first ferromagnetic disc member upstream is made to be progressively less or more along the length of the tube toward the output end thereof. The distance between the center of the gap and the first upstream pole piece therefrom is designated "j." In FIG. 5, a pair of sections 200 and 201 of a slow-wave structure like that shown in FIG. 1 are disposed successively along the length of the traveling-wave tube 10. Within each of the sections 200 and 201, the distance j is carried through its maximum range of from nearly e to zero. At an isolator section such as the typical isolator section 100 described in connection with FIGS. 2 and 4, the drift tube or the coupling gap has been shifted to its extreme left and obviously could not effectively be shifted further. As the traveling wave energy, however, passes into the isolator section 100, it is substantially terminated and the electron stream having passed through a long drift tube essentially "starts over" again upon entering the new amplifier section 201 where a new amount of tapering, like that of section 200 may be achieved independently of what tapering has been accomplished prior to the section 201. That is, the severing has removed any restriction imposed on maintaining any definite spacing between the successive gaps in the two separate sections; hence the same taper or a new tapering configuration can be used, irrespective of the tapering employed in the previous section. Thus the limits which exist in any single section do not carry over to other sections. In addition to the tapering achieved in he sections 200 and 201, the interaction cells of the section 201 may be tapered or altered with respect to those of the section 200. For example, the ferromagnetic pole pieces 202 of the section 200 may be axially thicker than the pole pieces 203 of the section 201. This may be designated web tapering. Thus the space periods of the interaction cells along the slow-wave structure are, according to FIG. 5 twice altered to provide tapering. In either case, as well as in the combination of the two means of tapering, the space period as seen by the electron stream is decreased or increased, with a minimum of changes in the parameters intrinsic to the interaction cells or to the magnetic lens gaps. Also, neither the magnet length nor the spacer length is necessarily altered.

Alternatively, the section 201 may have a different space period due to the dimensions e and f being altered as by changing the axial length of the spacers 204 of section 201 with respect to the length of the spacers 205 of the section 200 and this may be designated cavity tapering. In either event a full cycle of gap tapering may be incorporated into each of the sections 200 and 201. As previously indicated, the isolator section 100 not only permits the new cycle of gap tapering but it also obscures any other discontinuity in the electromagnetic characteristics of the slow-wave structure along its length because the isolator terminates substantially all radio frequency energy entering it from either direction along the slow-wave structure.

Referring to FIG. 6, there is shown a composite length of slow-wave structure which illustrates, with an example of five different amplifying sections 220—224, the versatility of the present invention and its subcombinations. In the first section shown, section 220, the web thicknesses of the pole pieces 225 are constant, that is, g, h, and i do not vary along the section 220. In the second section, section 221, the web thicknesses of pole pieces 226 are again constant but are less than those of the section 220. In addition, a full cycle of gap tapering is achieved in each of sections 220 and 221. Throughout both of the sections 220 and 221 the lengths of the spacers 228 and magnets, not shown, are constant. This tapering between the sections 220 and 221 may be designated step tapering.

In the third section 222 and the fourth section 223 the same pole pieces are used throughout but the spacers 232 of the section 222 are longer than the spacers 234 of the section 223. That is, h and i are constant throughout; e, f, and g are constant within each of the sections 222 and 223 but are less in the section 223 than in the section 22. Thus another type of step tapering has been shown.

In the fifth section 224, in combination with a full cycle of gap tapering, both web tapering and cavity taperings are utilized. Accordingly, all the dimensions e, f, g, h, and i are varied to be successively smaller toward the output or collector end. Thus the pole pieces 236—242 are successively thinner and the length of the spacers 244—248 is less toward the collector end. Such a system might be especially beneficial at the very output end of the tube because of the rapid deceleration of the electron stream in that region.

A further advantage, in addition to those of improved efficiency discussed above, to be gained in tapering a slow-wave structure as taught herein is that of improving the bandwidth characteristics of the tube. The tapering permits the circuit velocity to be varied so that, with a given electron beam velocity and a dispersive structure, the gain may be made constant over a greater portion of the circuit passband. The effect of this is analogous to the effect produced by stagger or offset tuning of cascaded, tuned amplifier stages in conventional vacuum tube circuitry.

There has thus been described a novel periodically focused, tapered slow-wave structure traveling-wave tube which combines in one typical element thereof a radio frequency slow-wave structure interaction cell and a periodic focusing magnetic lens structure. Some of the many advantages incumbent in the structure to be claimed below are set forth above in the introduction. Many others will become apparent to those skilled in the art who take advantage of the technological advances described here and incorporated in traveling-wave tubes constructed in accordance with these teachings. Other and additional inventive features may be incorporated into traveling-wave tubes of this character, for example: impedance matching devices for further broadening the band of operation and improving the coupling efficiency between the slow-wave structure and an external transmission line; means providing greater stability with regard to undesired oscillations such as those caused from excessive interaction between the electron beam and higher order perturbed cavity modes or wave-guide modes associated with the nearly periodic, tapered filter type circuit hereinabove discussed; and means for providing automatic self-alignment in the assembly of this type of slow-wave structure.

I claim:

1. A slow-wave structure for a traveling-wave tube having an axis and an electron gun for projecting an electron stream along said axis comprising: a plurality of radio frequency isolated groups of substantially space periodic interaction cells disposed sequentially along said axis of the traveling-wave tube, individual ones of said interaction cells being coupled at a coupling point therein to said electron stream, the axial spacing of said coupling points being varied to provide a space periodicity different from that of said interaction cells, said spacing of said coupling points being varied throughout [more than one] *at least two* of said plurality of groups, *and the space periodicities of the cells of said two groups being different from one another.*

2. A slow-wave structure for a traveling-wave tube having an axis and an electron gun for projecting an electron stream along said axis comprising: a plurality of radio frequency isolated groups of substantially space periodic interaction cells disposed sequentially along said axis of the traveling-wave tube, individual ones of said interaction cells being coupled at a coupling point therein to said electron stream, the axial spacing of said coupling points being varied to provide a space periodicity different from that of said interaction cells, said spacing of said coupling points being varied throughout more than one of said plurality of groups, said interaction cells *of each of said groups of cells* having a predetermined [spaced] *space* period [throughout each of said groups of cells, the said predetermined space periodicities of] different [ones of said groups being at a selected predetermined relation to one another] *from that of the cells of each of the other groups.*

3. In a traveling-wave tube of the character having an axis along which an electron stream is projected, a slow-wave structure comprising: a plurality of groups of substantially space periodic interaction cells for radio frequency energy positioned successively along said axis of the traveling-wave tube in proximity to said electron stream; radio frequency attenuator means positioned between the different adjacent ones of said interaction cells to define the groups thereof, the cells of at least one of said groups having a successively varying periodicity of axial length within the group, and the periodicity of the cells of at least one of the groups being varied with respect to the periodicity of the cells of at least one other of the groups.

4. In a traveling-wave tube having an axis and an electron gun for projecting an electron stream along said axis, a slow-wave structure comprising: a plurality of radio frequency isolated groups of substantially space periodic interaction cells disposed sequentially along said axis of the traveling-wave tube, individual ones of said interaction cells being coupled at a coupling point therein to said electron stream, the axial spacing of said coupling points being varied to provide a space periodicity different from that of said interaction cells, said spacing of said coupling points being varied throughout more than one of said plurality of groups, said interaction cells *of each of said groups of cells* having a predetermined space period [throughout each of said groups of cells, the said predetermined space periodicities of] different [ones of said groups being at a selected predetermined relation to one another] *from that of the cells of each of the other groups,* and isolator means disposed between individual ones of said groups for radio frequency terminating the ends of said groups.

5. A slow-wave structure having an elongated axis for providing interaction of radio frequency energy with an electron stream passing along said axis comprising: means defining a plurality of interaction cells spaced sequentially along said axis, said means including a plurality of drift tubes, means electromagnetically isolating selected ones of said cells from the adjacent cells to provide groups of interaction cells, the drift tubes within each of said groups being successively axially displaced in sequential fashion with respect to the position of the associated interaction cells, the interaction cells of successive ones of said groups having a successively closer spacing.

6. A severed slow-wave structure having a longitudinal axis for providing interaction of radio frequency energy with an electron stream projected along said longitudinal axis comprising: isolator means defining a plurality of groups of radio frequency isolated interaction cells spaced in noninterfering relation with said stream sequentially along said axis: *each of said cells being defined by a pair of transverse walls,* a plurality of drift tubes, individual ones of which being associated with individual ones of said [interaction cells] *walls,* said drift tubes [associated] within [each] *at least two* of said groups being *progressively* successively axially displaced [in substantially continuous fashion] with respect to the axial position of its respective associated [interaction cell] *wall,* the interaction cells within at least one of said *two* groups having [thereby an apparently] *a* closer spacing as seen by said electron stream than that of [said] *the* cells *within the other of said two groups.*

7. A traveling-wave tube slow-wave structure of the character having an elongated axis along with an electron stream is projected comprising: a plurality of radio frequency interaction cells disposed successively along the path of the electron stream of the traveling-wave tube, each of said interaction cells having the general form of a pair of axially separated drift tubes encompassing the electron stream, a pair of supporting discs extending radially outward from each of the drift tubes and a spacer ring between the adjacent discs and substantially concentric with the drift tubes; radio frequency attenuating means positioned at and between selected individual interaction cells, thereby to define individual groups of interaction cells along the slow-wave structure, said groups of interaction cells being arranged to have different, apparent and actual periodicities in a selected pattern, at least one of said groups having a successive variation in the axial position of the drift tubes therein with respect to the supporting discs, the spacing between the drift tubes remaining the same while the position of the spacing axially with respect to the discs is successively shifted within the cell from a point adjacent one disc to a point adjacent the relatively opposite disc, and the cells of at least one of the groups having discs of different axial dimensions than the cells of at least one other of the groups.

8. A traveling-wave tube comprising electron gun means providing an electron stream, collector means spaced apart from said electron gun means and defining therewith an axis for the traveling-wave tube, and a slow-wave structure positioned along and about said axis for providing interaction of said radio frequency energy with the electron stream, said slow-wave structure comprising: a plurality of pole piece discs positioned successively along and about said axis, said discs having central apertures for the passage of the electron stream therethrough; a plurality of drift tube-defining ferrules, each positioned within the central aperture of a different pole piece disc and concentric with said axis; and a plurality of individual spacer rings concentric with the axis and encompassing said electron stream at a radial distance greater than said ferules, each of said spacer rings being positioned between a different adjacent pair of said pole piece discs, adjacent ones of said ferrules and the adjacent sides of the associated pole piece discs forming together with said spacer rings an interaction cell of said slow-wave structure; attenuating means positioned within individual selected ones of said interaction cells at selected points along said slow-wave structure thereby to define radio frequency isolated groups of interaction cells, the axial position of the ferrules within each group with respect to the associated pole piece discs being sequentially varied, the axial spacing between adjacent ferrules remaining the same, thus to provide an apparent change in the periodicity of the group of interaction cells, the axial thickness of the pole piece discs in the adjacent groups being altered in a succesive fashion, thereby to provide an actual change in the periodicity of one group of cells with respect to another.

9. A traveling-wave tube slow-wave structure of the character having an elongated central axis along which an electron stream is projected comprising: a plurality of radio frequency interaction cells disposed successively along the path of said electron stream, each of said interaction cells having the general form of a pair of axially gapped, separated drift tubes and contiguously encompassing the electron stream; a pair of ferromagnetic supporting discs extending radially outwardly from each of the drift tubes and a spacer ring between the adjacent discs and substantially concentric with the drift tubes; radio frequency isolating means positioned at and between selected individual interaction cells, thereby to define electromagnetically isolated groups of interaction cells along the slow-wave structure, said groups of interaction cells being arranged to have different apparent and actual periodicities in a selected pattern, at least one of said groups having a succesive variation in the axial position of the drift tubes therein with respect to the supporting discs, the gap between the drift tubes remaining the same while the position of the spacing axially with respect to the discs is successively shifted within the cell from a point adjacent one disc to a point adjacent the relatively opposite disc and the cells of at least one of the groups having spacer rings of a different axial dimension than those of the cells of at least one other of the groups.

10. A web tapered and cavity tapered, severed traveling-wave tube slow-wave structure having a longitudinal axis and comprising: means providing an electron stream along said longitudinal axis of said tube; a plurality of magnetic, electrically conductive elements having predetermined axial dimensions, each positioned individually at a different point with predetermined spacing along the length of the longitudinal axis of said tube and each extending into close relation with the electron stream which is provided; means including a highly conductive surface disposed upon the portions of said magnetic conductive elements which are in close relation to the electron stream, thereby to provide a slow-wave structure; and means including a plurality of annular magnet means, each positioned between a different adjacent pair of said magnetic conductive elements and encompassing the electron stream for providing a magnetic field employing said elements to complete a portion of the flux path therefrom, said predetermined axial dimensions of at least some of said magnetic, conductive elements and said predetermined spacing thereof being progressively lessened toward the output end of said traveling-wave tube structure.

11. A traveling-wave tube slow-wave structure of the character having an axis along which an electron stream is projected comprising: a plurality of radio frequency interaction cells disposed successively along the path of said electron stream, each of said interaction cells having the general form of a pair of axially gapped, separated drift tubes and contiguously encompassing the electron stream; a pair of ferromagnetic supporting discs extending radially outwardly from each of the drift tubes and a spacer ring between the adjacent discs and substantially concentric with the drift tubes; radio frequency isolating means positioned at and between selected individual interaction cells, thereby to define electromagnetically isolated groups of interaction cells along the slow-wave structure, said groups of interaction cells being arranged to have different apparent and actual periodicities in a selected pattern, at least one of said groups having a successive variation in the axial position of the drift tubes therein with respect to the supporting discs, the gap between the drift tubes remaining the same while the position of the spacing axially with respect to the discs is successively shifted within the cell from a point adjacent one disc to a point adjacent the relatively opposite disc, the cells of at least one of the groups having spacer rings of a different axial dimension than those of the cells of at least one other of the groups, and the cells of at least one of the groups having discs of a different axial dimension than those of the cells of at least one other of the groups.

References Cited in the file of this patent or the original patent

UNITED STATES PATENTS

| | | |
|---|---|---|
| 2,543,082 | Webster | Feb. 27, 1951 |
| 2,636,948 | Pierce | Apr. 28, 1953 |
| 2,637,001 | Pierce | Apr. 28, 1953 |
| 2,741,718 | Wang | Apr. 10, 1956 |
| 2,810,854 | Cutler | Oct. 22, 1957 |
| 2,813,996 | Chodorow | Nov. 19, 1957 |
| 2,847,607 | Pierce | Aug. 12, 1958 |